United States Patent [19]
Crain et al.

[11] Patent Number: 5,308,214
[45] Date of Patent: May 3, 1994

[54] WHEELCHAIR LIFT APPARATUS

[75] Inventors: John E. Crain, Birmingham; Mariano T. Cadiz, Rochester Hills; James J. Todd, Commerce Township, Oakland County; Lawrence J. Teal, Canton, all of Mich.

[73] Assignee: Chrysler Corporation, Highland Park, Mich.

[21] Appl. No.: 28,065

[22] Filed: Mar. 8, 1993

[51] Int. Cl.$^5$ .............................................. B60P 1/44
[52] U.S. Cl. .................................... 414/541; 414/545; 414/921
[58] Field of Search ............................... 414/539–545, 414/921, 462

[56] References Cited

U.S. PATENT DOCUMENTS

| | | | |
|---|---|---|---|
| 3,847,292 | 11/1974 | Williams et al. | 414/541 |
| 4,096,955 | 6/1978 | Dake | 414/921 X |
| 4,133,437 | 1/1979 | Gates | 414/921 X |
| 4,155,587 | 5/1979 | Mitchell | 414/921 X |
| 4,170,368 | 10/1979 | Southward et al. | 414/921 X |
| 4,278,387 | 7/1981 | Seguela et al. | 414/921 X |
| 4,299,527 | 11/1981 | Pobocik et al. | 414/462 |
| 4,457,663 | 7/1984 | Hems et al. | 414/921 X |
| 4,479,753 | 10/1984 | Thorley | 414/541 |
| 4,493,602 | 1/1985 | Koerber | 414/541 |
| 4,493,603 | 1/1985 | Williams et al. | 414/541 |
| 4,551,060 | 11/1985 | Quercy | 414/541 |
| 4,583,466 | 4/1986 | Reddy et al. | 414/545 X |
| 4,616,972 | 10/1986 | McFarland | 414/462 X |
| 4,664,584 | 5/1987 | Braun et al. | 414/541 |
| 4,786,072 | 11/1988 | Girvin | 414/921 X |
| 5,052,879 | 10/1991 | Wolfe | 414/541 |
| 5,096,361 | 3/1992 | Crawford | 414/921 X |
| 5,106,121 | 4/1992 | Boone | 280/807 |

FOREIGN PATENT DOCUMENTS

| | | | |
|---|---|---|---|
| 2617754 | 11/1977 | Fed. Rep. of Germany | 414/921 |
| 2456002 | 1/1981 | France | 414/921 |
| 010422 | 6/1992 | World Int. Prop. O. | 414/921 |

Primary Examiner—David A. Bucci
Attorney, Agent, or Firm—Edward P. Barthel

[57] ABSTRACT

A wheelchair lift apparatus which may be adapted for use in an existing motor vehicle in lieu of a seat structure removably coupled to the floor pan. The lift apparatus includes a motor driven horizontal screw for laterally moving a platform across the vehicle to exit the rear passenger compartment through a side door opening. The platform has a vertical side extension and carries a foldable wheelchair, for example, whose two sides collapse inwardly. The lift apparatus further includes motor driven linkage members for pivoting the platform and folded wheelchair from outside the rear passenger compartment toward the front of the vehicle. The platform and folded wheelchair are next vertically adjusted alongside either the driver or a front seat passenger door opening, depending upon whether the side door opening is on the right or left side of the vehicle. An additional motor driven linkage member is operative for downwardly pivoting the vertical side extension to a coplanar position with the platform so as to extend its effective surface for supporting the unfolded wheelchair, ready to receive the driver or front seat passenger; and a motor driven vertical screw for lowering and raising the platform and wheelchair.

20 Claims, 12 Drawing Sheets

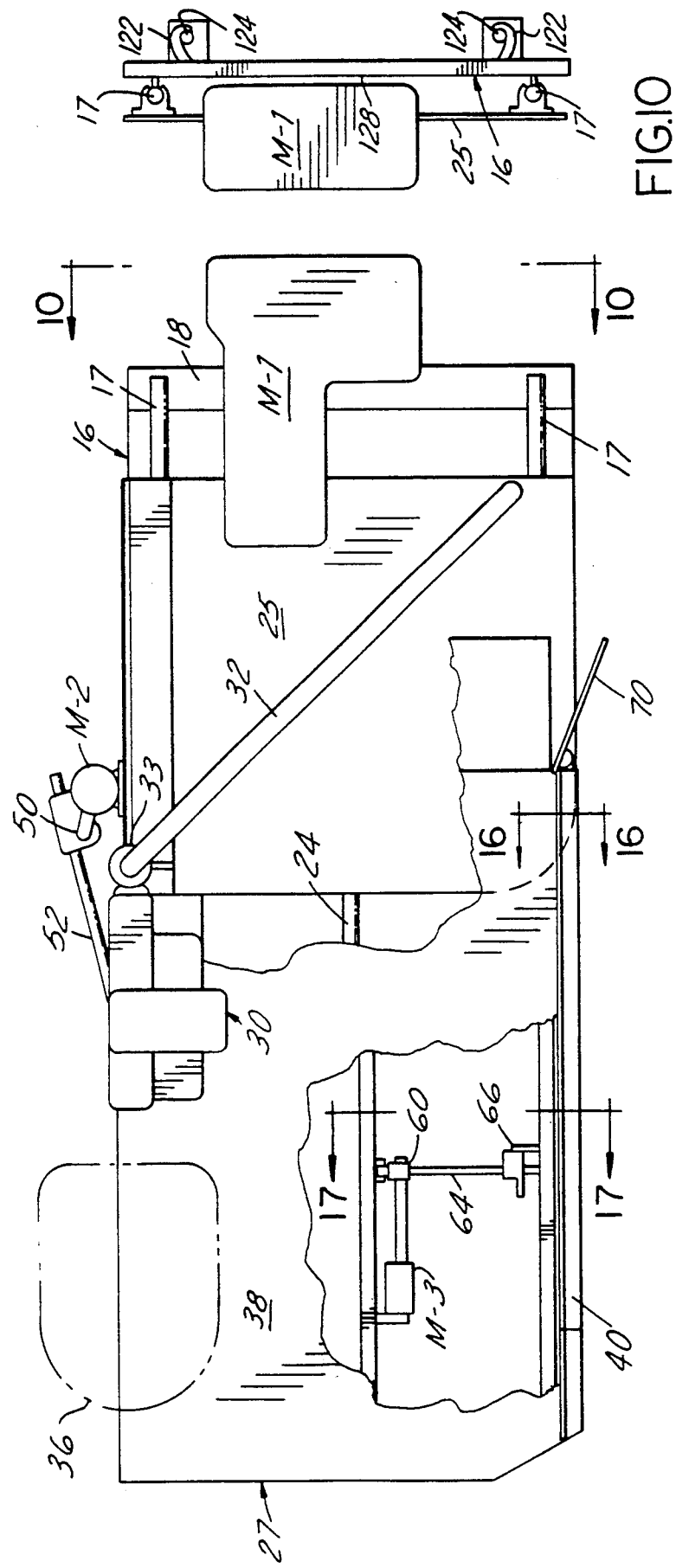

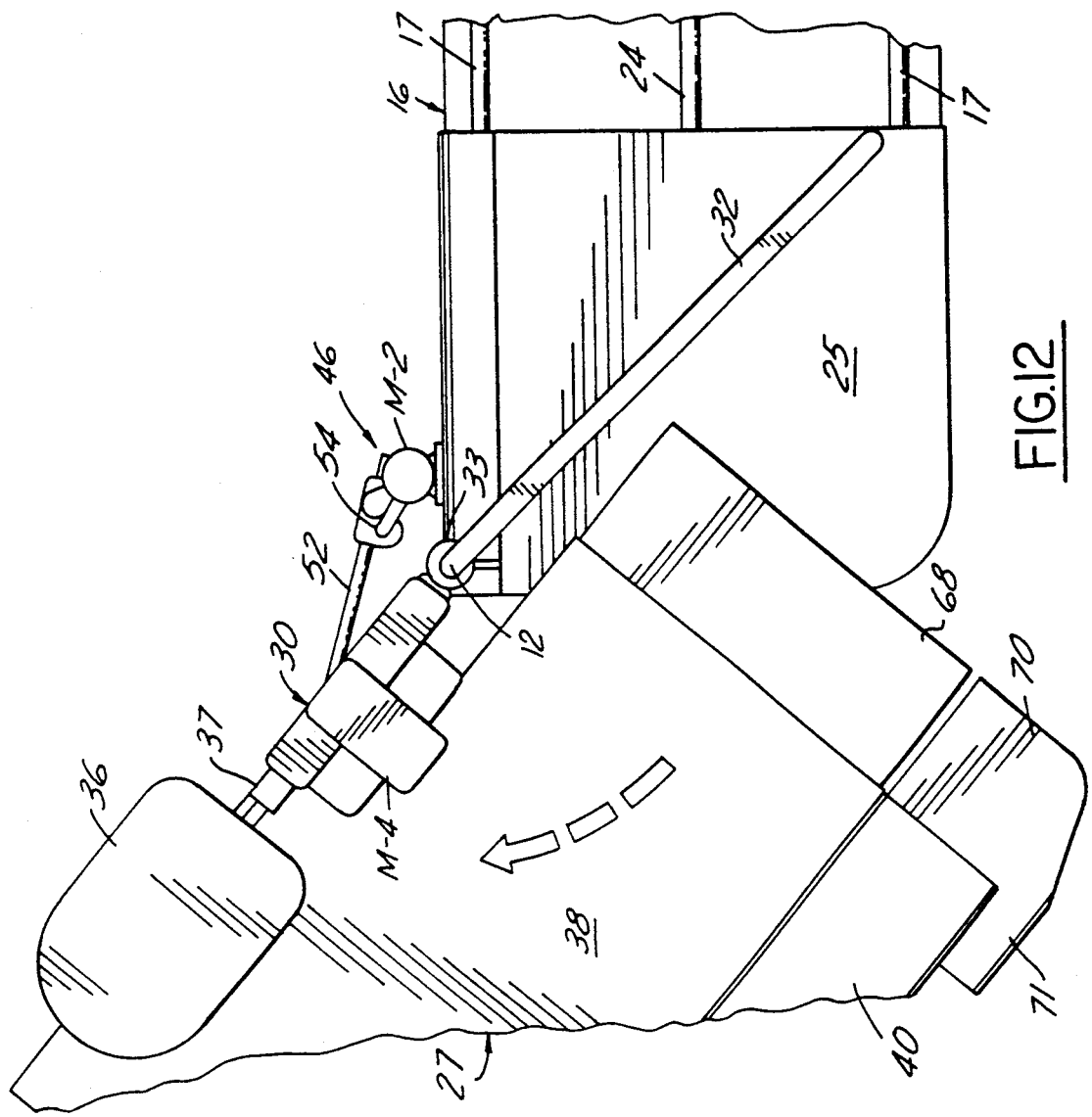
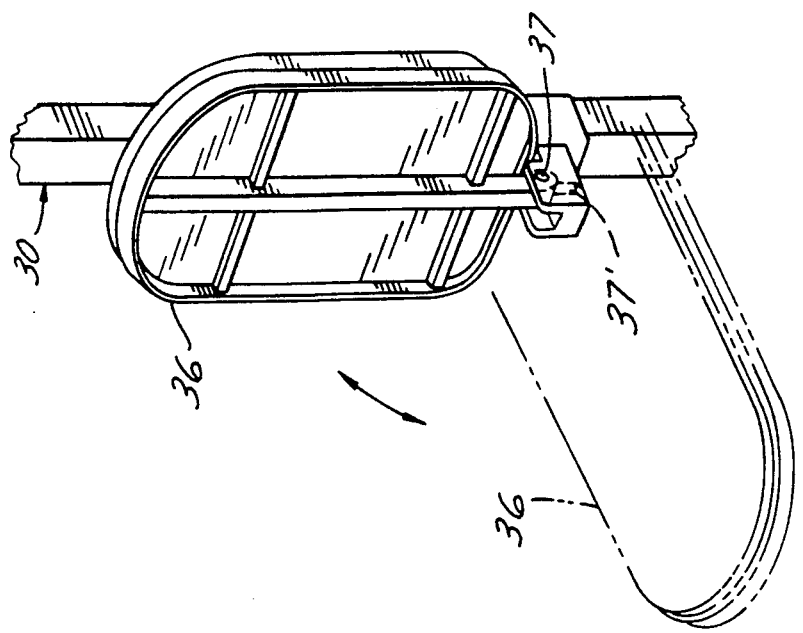

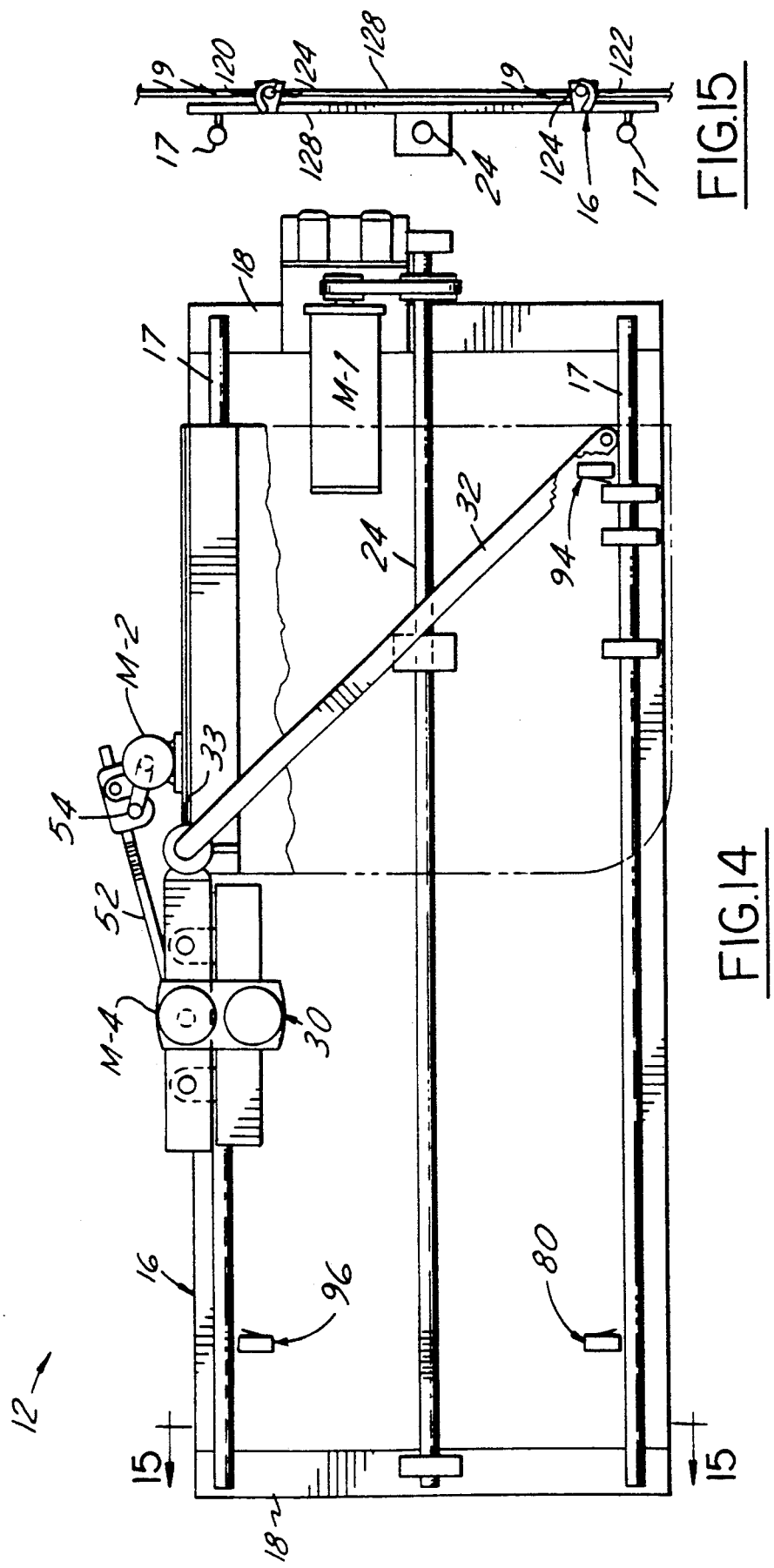

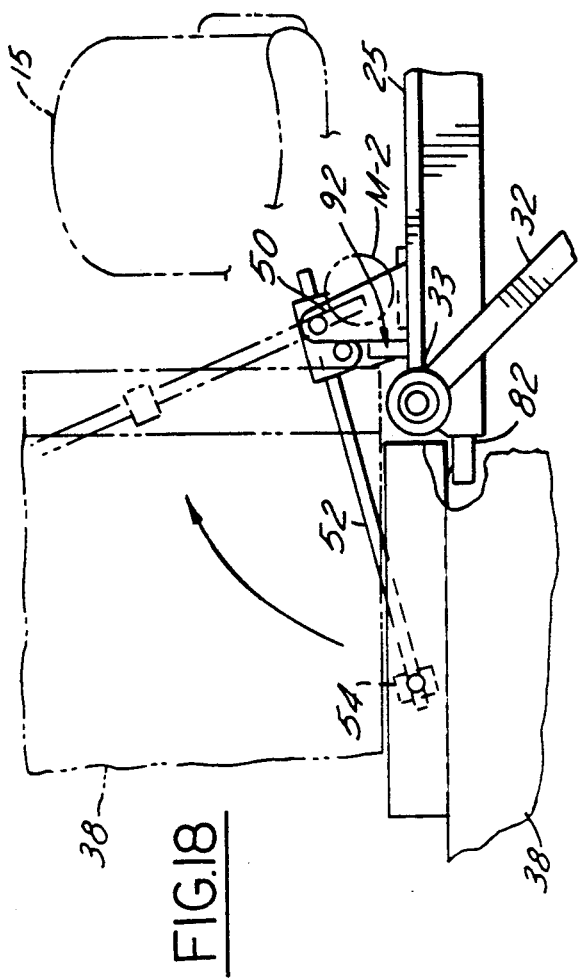
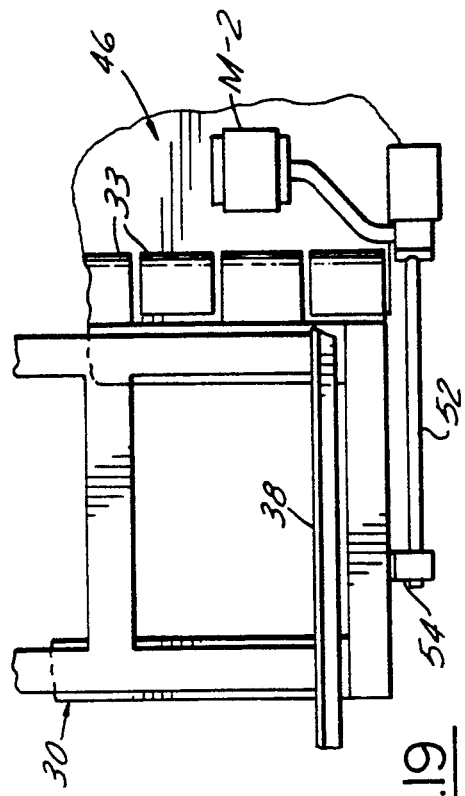
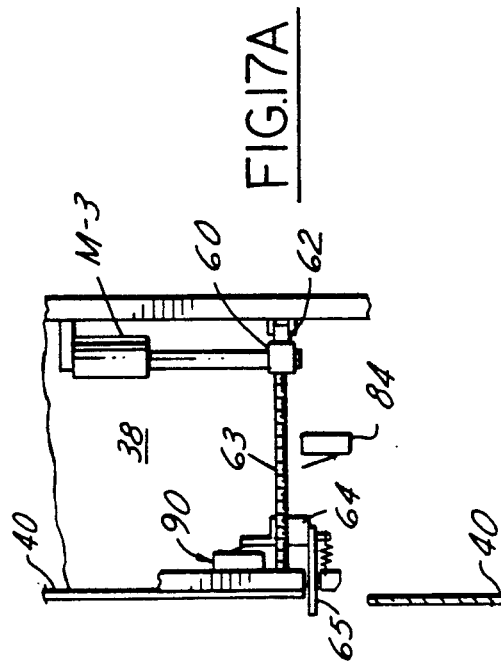
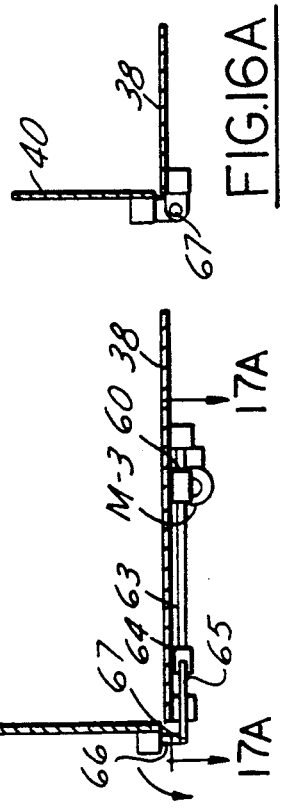

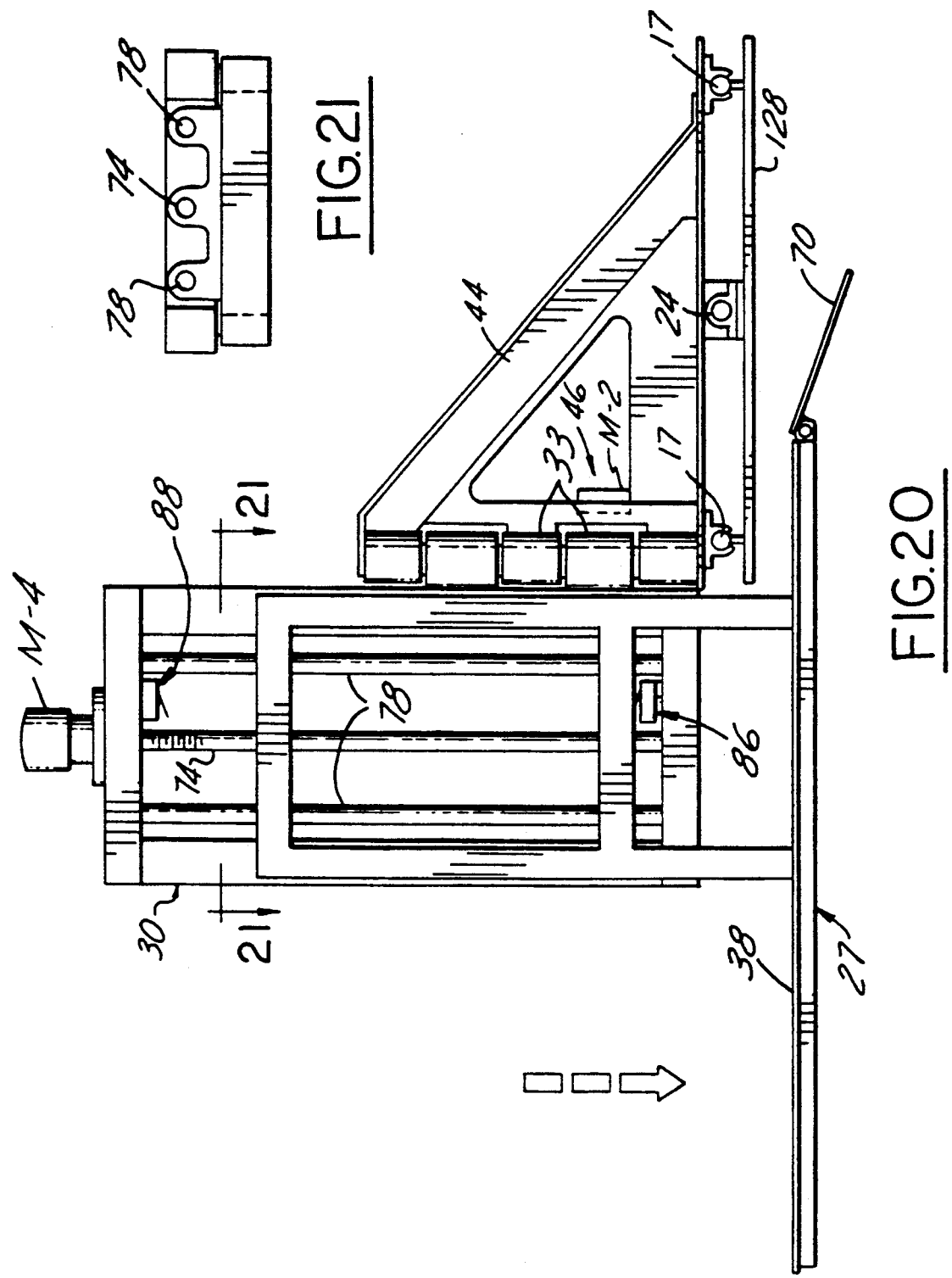

WHEELCHAIR LIFT APPARATUS

TECHNICAL FIELD

This invention relates generally to wheelchair lift apparati and, more particularly, to wheelchair lift apparati which are adaptable for use in a vehicle through the side door thereof.

BACKGROUND ART

Wheelchair lift apparati for use in vehicles are known. For example, Braun et al U.S. Pat. No. 4,664,584 discloses a rotary wheelchair lift including a hydraulic lift having a vertically telescoping slide tube and a horizontal wheelchair platform attached to the lower end thereof. A platform extension accommodates wheelchairs of various sizes and types. An in/out switch causes the platform to be rotated into and out of the vehicle. A fold-down handrail permits the user to safely ride with the apparatus into the vehicle, and then wheel off the platform to the vehicle controls as the driver. For dismounting from the vehicle, the user reverses the procedure by first rolling onto the platform.

Koerber U.S. Pat. No. 4,493,602 discloses another rotary wheelchair lift apparatus for automatically lifting the user from ground level into the van and then out of the van without any need for the user to leave the wheelchair. The apparatus includes a vertical drive screw driven by a motor via a pulley belt, in conjunction with a one-way clutch. A further pivotally mounted motor and drive screw serve to pivot the support column and lift frame.

Wolfe U.S. Pat. No. 5,052,879 discloses a wheelchair lift and transfer system designed to enable a user to independently enter a vehicle and drive the vehicle from his or her wheelchair without leaving the wheelchair platform. It includes the platform and an associated fold-down ramp, with vertical lift cylinders connected to the side of the platform adjacent the vehicle, and horizontal cylinders connected to the vertical cylinders to pull the platform along tracks into the vehicle.

Williams et al U.S. Pat. No. 4,493,603 discloses still another wheelchair lift apparatus for positioning a wheelchair under the steering wheel. This apparatus includes a drive motor and vertical screw for lifting and lowering, and a motor and gear reduction unit, pinion, and gear sector for pivoting.

Quercy U.S. Pat. No. 4,551,060 discloses a motor and vertical screw driven platform which is then pivotable along a rail to a position beneath a fold-down vehicle seat.

Dake U.S. Pat. No. 4,096,955 discloses a lifting mechanism including cantilevered arms vertically and pivotally movable for moving a wheelchair and its occupant to and from a van, and further including tilting means for tilting the wheelchair and occupant prior to lifting for the occupant's safety during lifting.

Gates U.S. Pat. No. 4,133,437 discloses a wheelchair lift apparatus including a rotatable post, a pivotally mounted motor for rotating the post through a pinion and gear drive, and a carriage slidable along the post via a motor driven belt and pulley for driving a lead screw.

Boone U.S. Pat. No. 5,106,121 discloses a bench seat structure which is adapted to be removably coupled to the vehicle floor pan and which may be readily replaced by the inventive wheelchair lift apparatus.

DISCLOSURE OF THE INVENTION

A general object of the invention is to provide an improved wheelchair lift mechanism.

Another object of the invention is to provide a wheelchair lift mechanism which is adaptable to being mounted in a vehicle, such as a van-type vehicle, via the removable seat latching mechanism thereof in place of a removed seat structure, and operable through the vehicle's side door opening.

Still another object of the invention is to provide a wheelchair lift mechanism which is adaptable to being pivotable to a position outside a van-type vehicle, which places the wheelchair directly beside either the front seat passenger or the vehicle operator via a door opening in a side wall of the vehicle which is selectively placed on either the passenger side or the driver side of the vehicle.

A further object of the invention is to provide a wheelchair lift mechanism which is laterally movable out through a vehicle side door, and then pivotally movable to a position directly behind the open front door, within the width of the latter so that no extra width parking space is required, and providing lateral access thereto across an assist seat by a user from a front seat.

A still further object of the invention is to provide a wheelchair lift mechanism including a motor driven horizontal screw for lateral movement of a platform having a vertical side and carrying a wheelchair whose two sides are collapsed inwardly; motor driven linkage members for pivoting the platform and wheelchair toward the front of the vehicle, alongside one of a driver or a front seat passenger; motor driven gears and stem members for pivoting a vertical side of the platform to a co-plane with the platform so as to provide a wide enough surface to support the spread-apart sides of the wheelchair, ready to receive the driver or passenger via an intermediate assist seat; a motor driven vertical screw for lowering and raising the platform and wheelchair for departure from the platform and return of the wheelchair and its user to the platform.

These and other objects and advantages will become more apparent when reference is made to the following drawings and the accompanying description.

BRIEF DESCRIPTION OF THE DRAWINGS

FIG. 9 is a plan view of the wheelchair lift platform in one operating position, with a portion thereof broken away;

FIG. 10 is an end view taken along the plane of the line 10—10 of FIG. 9, and looking in the direction of the arrows;

FIG. 11 is a view of the assist seat portion of FIG. 9, illustrating the two operative positions thereof;

FIGS. 12 and 13 are plan views of the platform in two different operative positions; FIG. 13 further includes a manual control unit therefore;

FIG. 14 is a plan view of the base frame of the invention;

FIG. 15 is a cross-sectional view taken along the plane of the line 15—15 of FIG. 14, and looking in the direction of the arrows;

FIGS. 16A and 17 are cross-sectional views taken along the planes of the lines 16—16 and 17—17 of FIG. 9, and looking in the direction of the arrows;

FIG. 17A is a view taken along the plane of the line 17A—17A of FIG. 17, and looking in the direction of the arrows.

FIGS. 18 and 19 illustrate further details of a portion of the FIG. 9 structure from the top and side thereof;

FIG. 20 is a side view of an uncovered portion of FIGS. 4–8;

FIG. 21 is a cross-sectional view taken along the plane of the line 21—21, of FIG. 20 and looking in the direction of the arrows.

BEST MODE OF CARRYING OUT THE INVENTION

Figure 1:
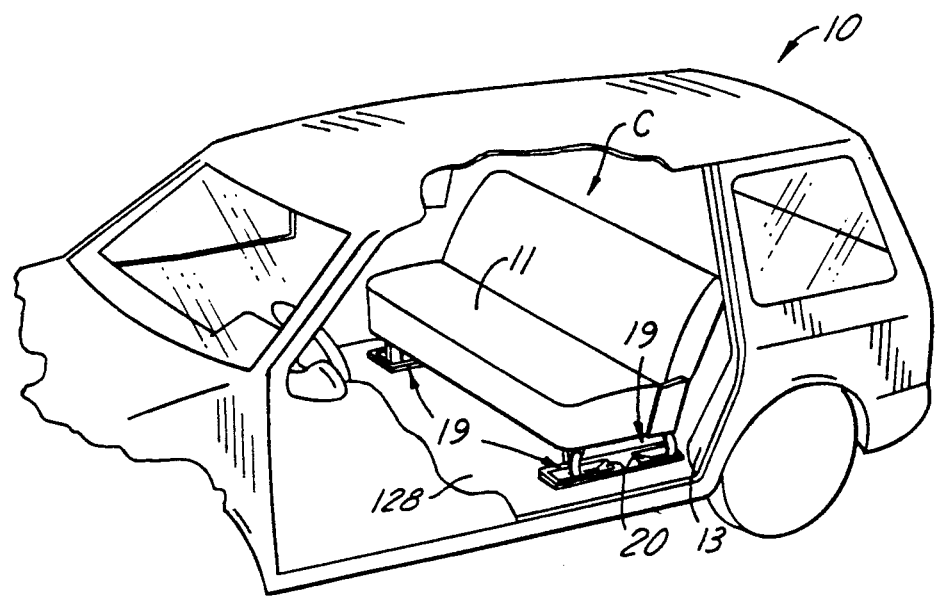
FIG. 1 is a fragmentary perspective view of a vehicle illustrating a removable bench seat which may be replaced by the invention.
Figure 2:
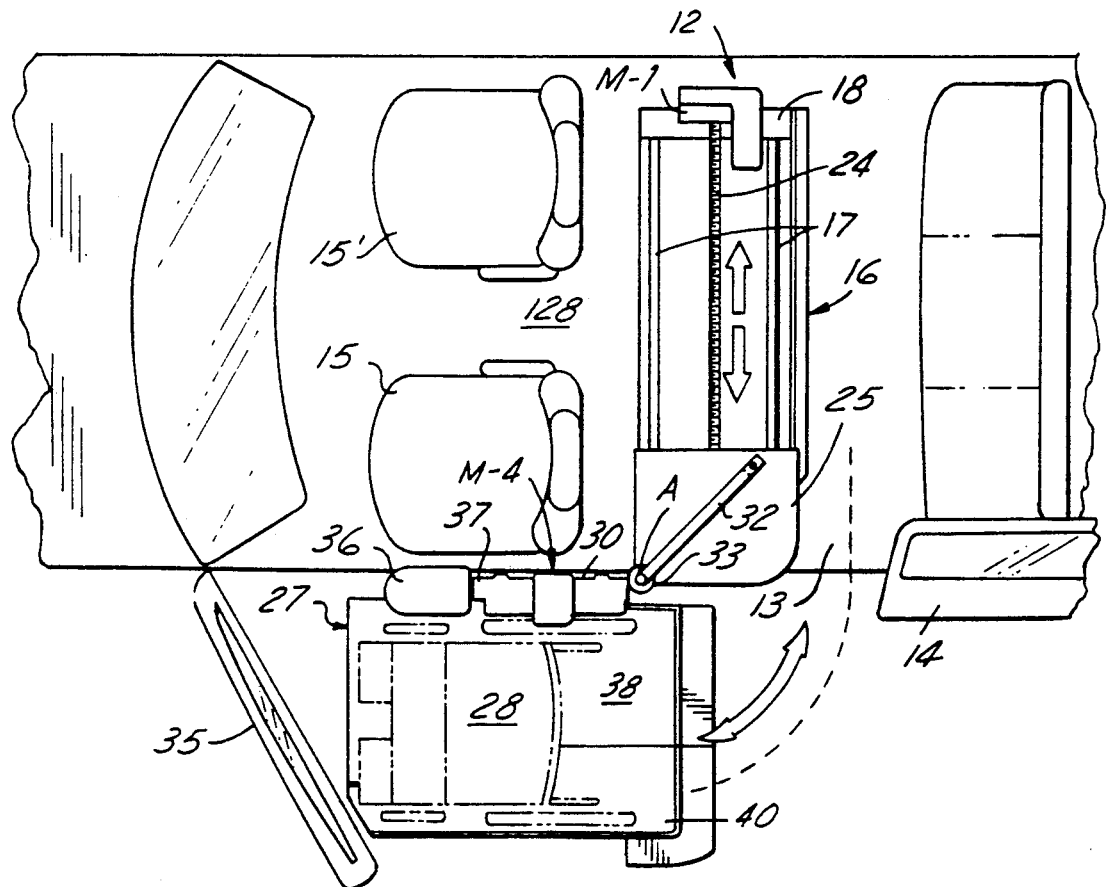
FIG. 2 is a fragmentary schematic plan view of a vehicle and the inventive wheelchair lift apparatus in one of the latter's operative positions.

Referring now to FIGS. 1 and 2 for a general overview of the invention, there is illustrated a van-type vehicle 10 having a passenger compartment C in which a wheelchair lift apparatus 12 (FIG. 2) is operatively mounted. While it is contemplated that the present invention may be used with various types of vehicles, the preferred embodiment discloses a van-type vehicle. The apparatus 12 is shown positioned laterally across the vehicle passenger compartment C in alignment with an opening 13 in a side wall of the vehicle, closed by a sliding side door 14. The apparatus 12 is located in the area normally occupied by a removable bench seat structure immediately behind a driver seat 15 and a front passenger seat 15'. Reference may be had to FIG. 1 depicting the vehicle 10 equipped with a conventional removable bench seat structure 11 in place of the wheelchair apparatus 12. It will be noted that in the disclosed embodiment the vehicle side door, such as the sliding door 14, is located on the driver or left side of the vehicle 10 in counter-distinction to conventional vans wherein the side door is on the right or passenger side. In the case of a vehicle 10 having a side door 14 located on the right side, an opposite-hand or mirror image wheelchair lift apparatus 12 would be utilized.

The wheelchair lift apparatus 12 provides a rectangular mounting frame 16 assembly which includes a pair of laterally extending fore and aft rails 17 and a pair of longitudinally extending end rails 18. Each rail 18 supports laterally spaced pairs of floor latching arrangements 19 (FIG. 3) on the under side thereof adapted to be removably coupled with existing vehicle floor mounting sockets 20. Reference may be had to U.S. Pat. No. 5,106,121 issued Apr. 21, 1992 to M. C. Boone for a detailed description of a conventional floor mounting socket adapted for use with the present invention.

Figure 13:
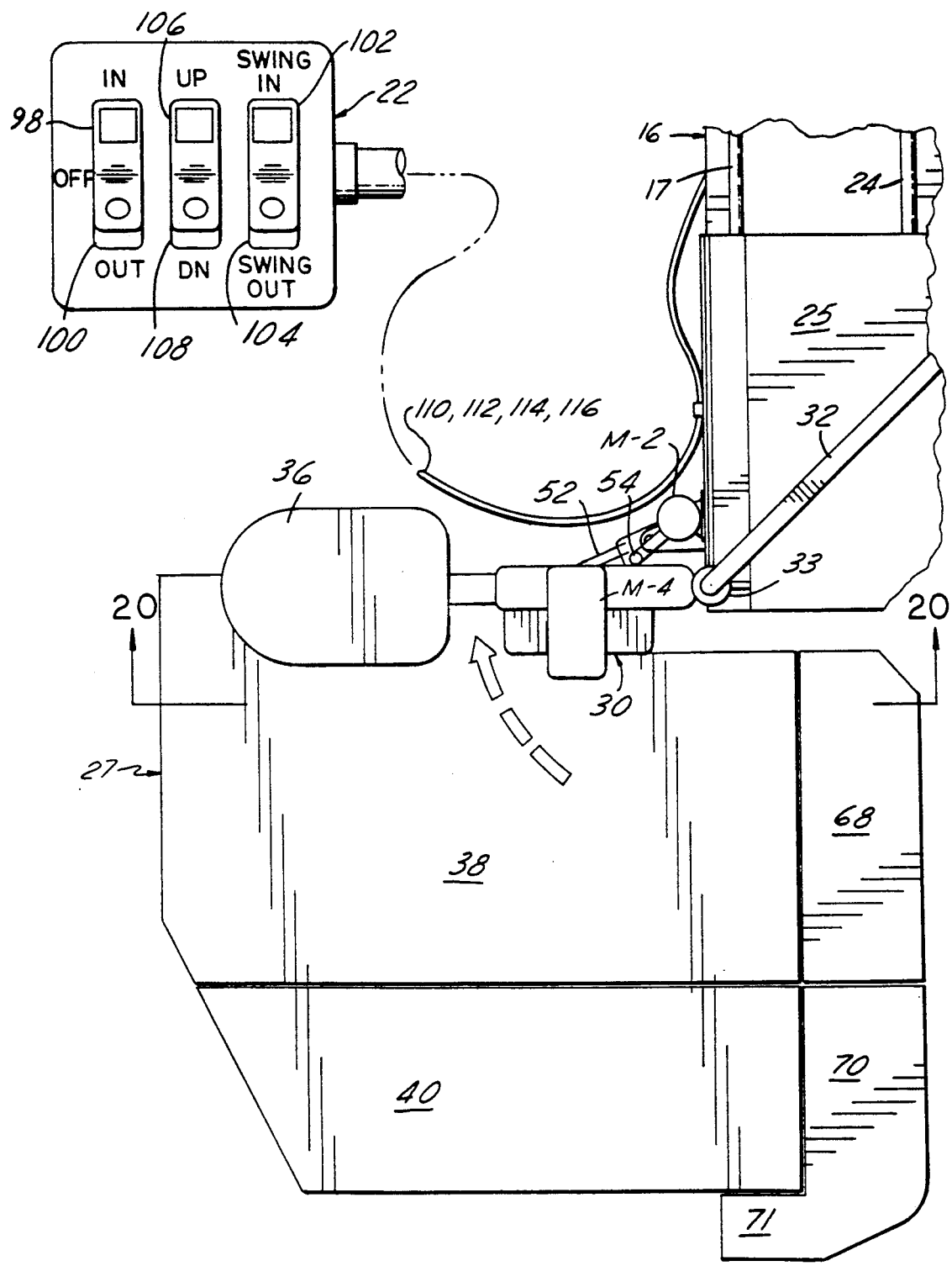

FIG. 2 shows a first electric motor M-1, supported on the end rail 18, adapted to be manually actuated by a wheelchair occupant by means of a hand control operating box shown generally at 22 in FIG. 13. The control box 22 has three manually operated toggle switches each of which has two nonlocking oppositely energizing positions and a biased neutral or "off" center position, as will be explained in more detail relative to the wiring diagram of FIG. 22.

Figure 5:
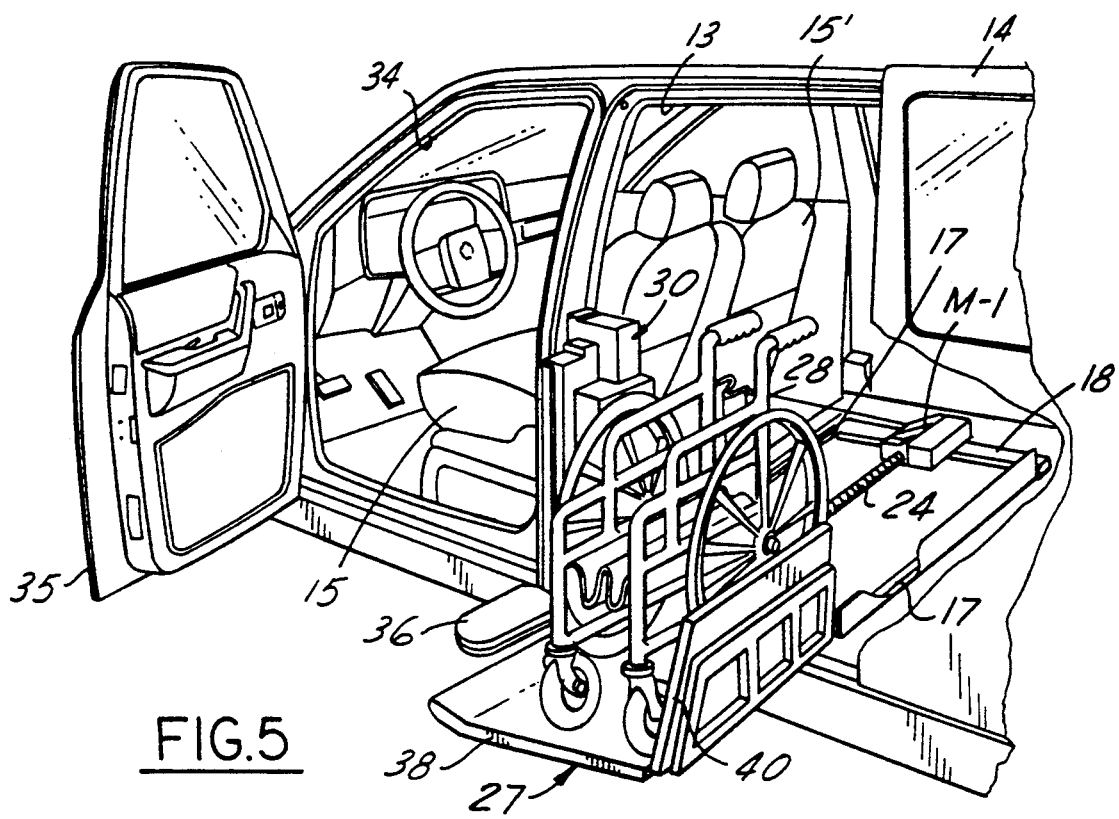
FIGS. 5-8 are perspective views of the wheelchair lift mechanism in various operative positions relative to a vehicle.

With reference to FIGS. 2 and 5, a threaded rod 24 is rotated by the first motor M-1 in one direction to drive a partial width horizontally disposed support plate 25 along the pair of guide rails 17 to the side door opening 13 of the vehicle. A lift platform 27, which carries a collapsed wheelchair 28, is supported on a vertically disposed stanchion 30. The lift platform 27 is pivotally connected by an angled rod 32 and hinge ears 33 (FIGS. 2 and 20) to the support plate 25. A second electric motor M-2 (FIG. 12), supported on an edge portion of the support plate 25, is adapted to swing the lift platform 27 ninety degrees relative to the support plate 25 about a vertical hinge pivot axis "A" positioning the platform 27 in the doorway 34 of the open front driver's side door 35. A third electric motor M-3 (FIG. 9), supported on the underside of the platform 27, is adapted to lower and raise a side portion of the platform, as will be explained, to permit the wheelchair 28 to be expanded to its full width. A fourth electric motor M-4 (FIGS. 2 and 20), supported on the upper end of the stanchion 30, is adapted to lower and raise the wheelchair and platform to and from the ground.

The wheelchair user is able to move from the driver's seat (or the front passenger seat) to a horizontally oriented assist seat 36 which is pivotally connected at a pivot 37 to the stanchion 30, and then to the wheelchair 28, after which the platform 27 and the wheelchair 28 are lowered along the height of the stanchion 30 to the ground. At this point, the wheelchair 28 and its passenger can leave the platform 27 toward the rear of the vehicle. As shown in FIG. 11, the assist seat 36 can be retained by a spring loaded detent 37' in a vertical position about the pivot 37.

Figure 4:
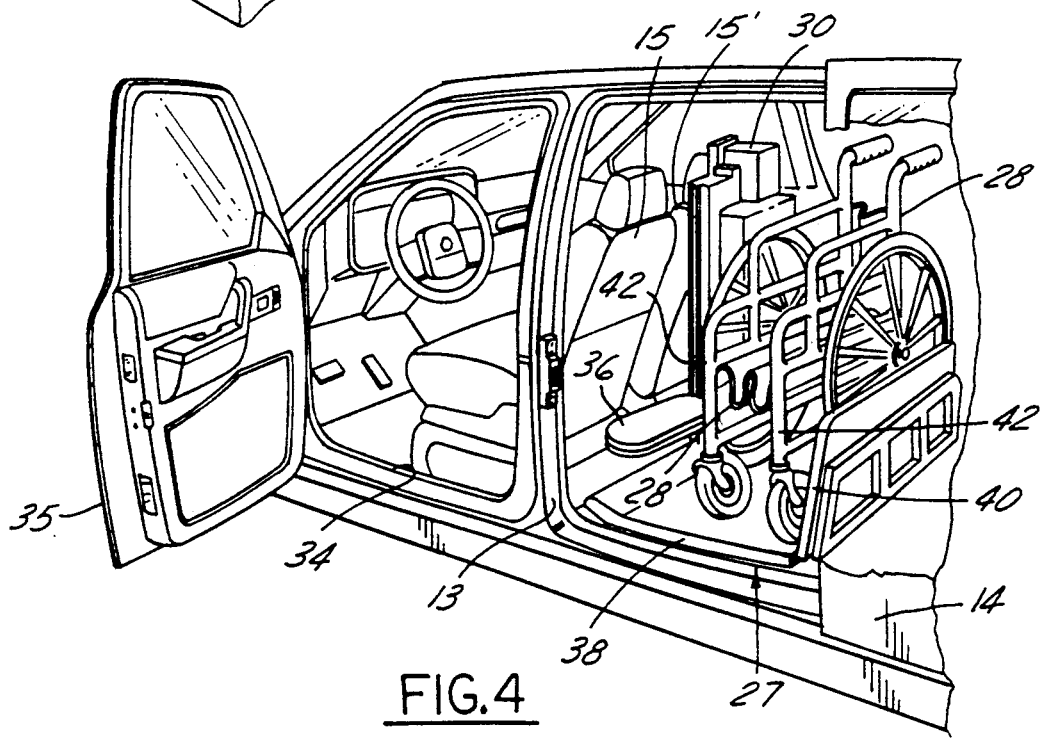
FIG. 4 is a fragmentary perspective view of a vehicle containing the inventive wheelchair lift mechanism in its usual position within the vehicle.

Referring now more specifically to FIG. 4, it is noted that, while the platform 27 and wheelchair 28 are carried in the vehicle 110, the platform 27 consists of a principal floor portion 38 and a pivotable side portion 40 which is pivotally secured to the floor portion in a vertical attitude while stored within the vehicle compartment C. The wheelchair 28 has its sides 42 collapsed so as to be moved close together to a stowed mode in order to fit on the floor portion 38.

FIG. 5 illustrates a second position, with the platform 27 portions 38 and 40 being moved leftwardly out of the vehicle side doorway 13 along the guide rails 17 by the threaded rod 24.

Figure 6:
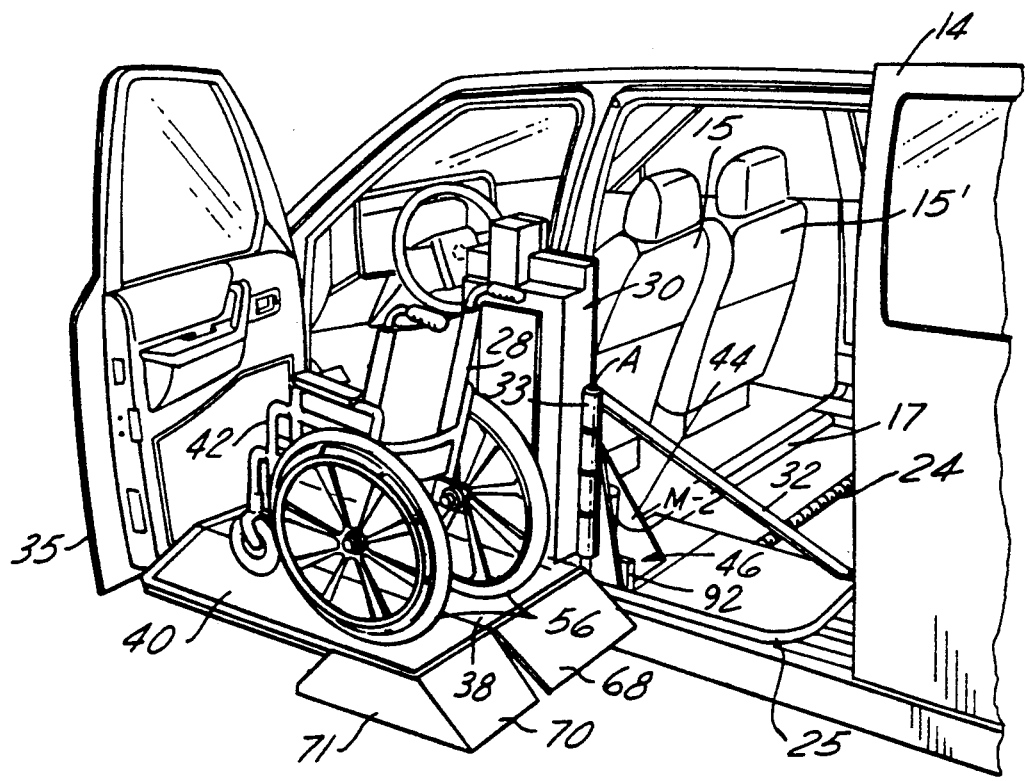
Figure 22:
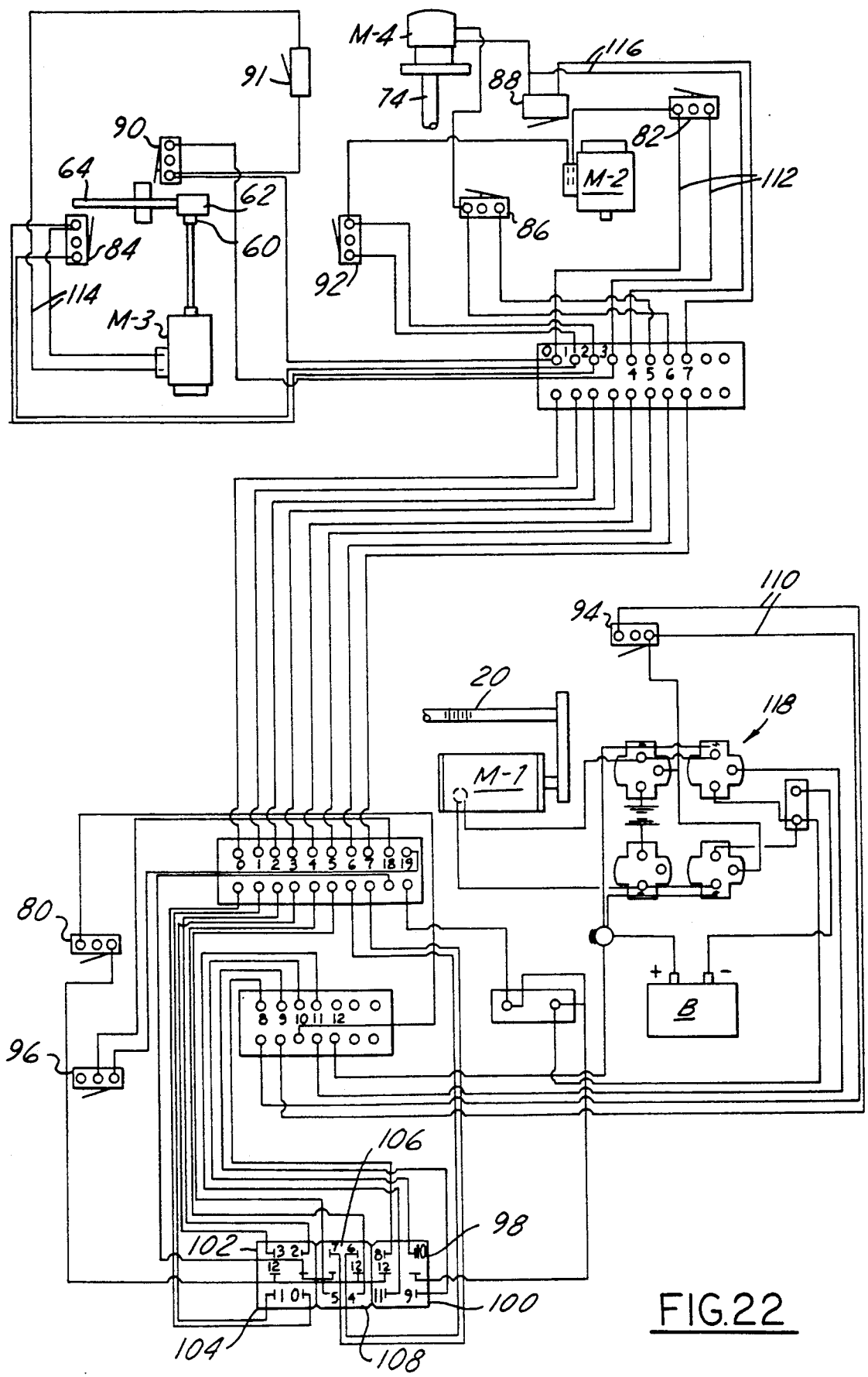
FIG. 22 is a suitable wiring diagram for the invention.

FIG. 6 illustrates the stanchion 30, the platform portions 38 and 40, and the wheelchair 28 having been pivoted from a position above the support plate 25 through 90° about the hinge 33 pivotally mounted between the stanchion 30 and a vertical bracket 44 secured to the plate 25. The movement of the members 30, 38, 40, and 28 is toward the front door opening 34, at a level which positions the wheelchair seat along side of the driver's seat 15. The pivoting is accomplished by pivoting means 46 consisting of the pivot motor M-2 (FIGS. 6 and 12), which may be actuated by a manual switch 102 (FIGS. 13 and 22). The motor M-2 is mounted on the bracket 44 and pivotal linkage members 50, 52 and 54 are mounted to extend under the stanchion 30 adjacent the platform portion 38 (FIGS. 9 and 18).

Figure 16:
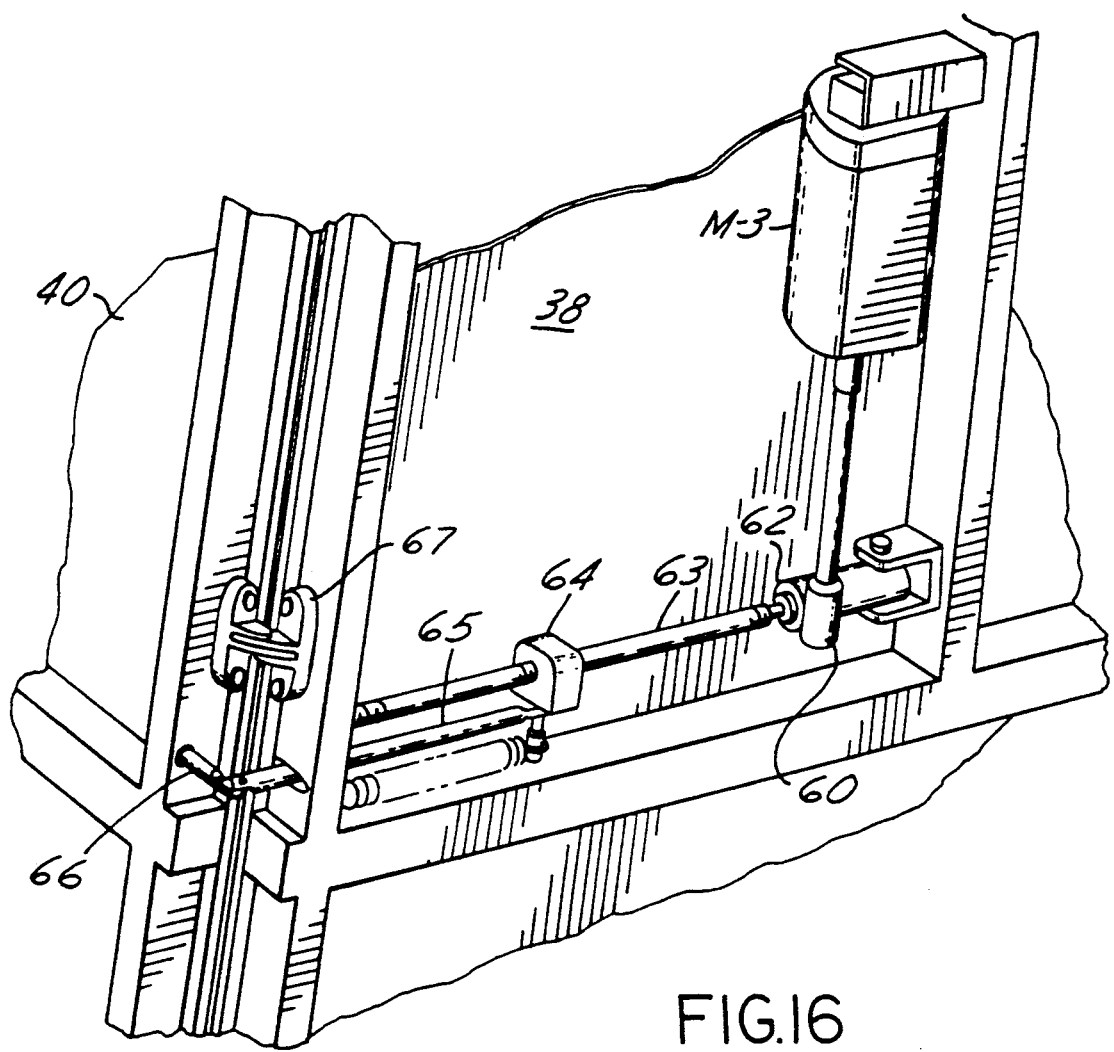
FIG. 16 is a fragmentary perspective view of a portion of the FIG. 9 structure.

Concurrently with the initial pivoting movement of the platform 27, the pivotable portion 40 thereof has been pivoted downwardly from vertical into the same plane as the floor portion 38 to enlarge the effective size of the lift platform, such that the sides 42 of the wheelchair 28 are able to be spread apart to an occupiable position, with the wheels 56 now positioned on the respective co-planar platform portions 38 and 40. As better shown in FIGS. 9, 16, 16A and 17, this action is accomplished by the motor M-3, which may be actuated by the same switch 102 which initiated the platform 27 pivoting action, mounted on the under side of the platform portion 38, serving to rotate a gear 60 meshing with a worm gear 62 to move a threaded screw 63 laterally through a drive nut 64 to move a reciprocable stem 65. The latter is pivotally connected to a rod 66 secured to the platform portion 40 for lowering same about hinge 67 (FIGS. 16 and 16A) operatively connected between the platform portions 38 and 40.

Also shown in FIG. 6 are rear ramps 68 and 70 and corner ramp 71, freely pivoted downwardly from the ends of the respective platform portions 38 and 40. When in its vertical attitude, the ramp 70 on the platform portion 40 overlaps the adjacent edge of the ramp 68 such that it retains the latter in relatively horizontal attitude for entry into the compartment C, without interference with the first end rail 18 of the frame 16.

Figure 7:
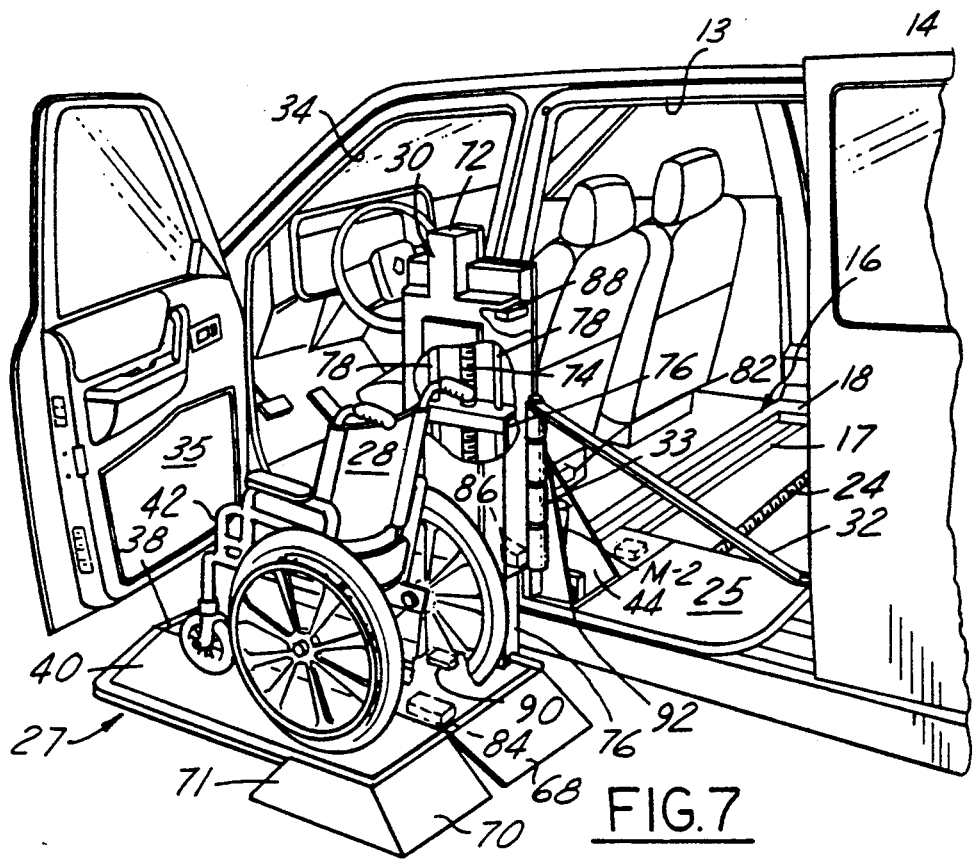

As shown in FIG. 7, the platform portions 38 and 40, and their associated wheelchair 28 and rear ramps 68 and 70 are next lowered along the stanchion 30 to a position where the ramps 68 and 70 engage the ground surface. The lowering operation is accomplished by the up/down motor M-4, which may be actuated by a manual switch 108 (FIGS. 13 and 22), which rotates a threaded rod 74 (FIG. 20), to move a support member 76 along guide rods 78. The platform portion 38 is secured to the bottom end of the support member 76.

Figure 8:
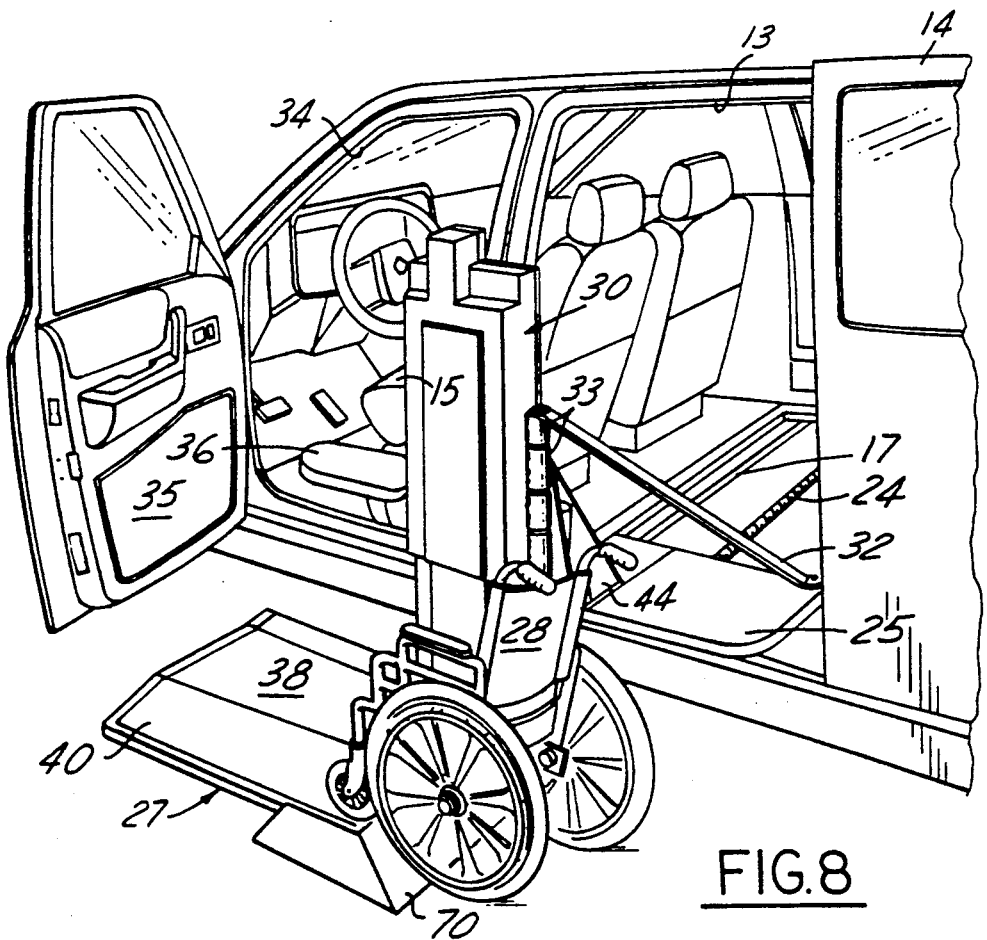

As shown in FIG. 8, the wheelchair 28 can now roll off the plate portions 38 and 40, down the ramps 68 and 70 to the ground surface.

Referring now to the wiring diagram FIG. 22, the above described motors and sequence are coordinated by operatively connected limit switches as follows:

a limit switch 80 stops the outward movement of the plate 25 and the platform 27;

a limit switch 82 stops the 90° rotation of the platform 27 at the position where the operator can spread the sides 42 of the wheelchair 28 and then board the latter;

a limit switch 84 stops the downward pivot of the vertical portion 40 of the platform 26;

a limit switch 86 stops the downward movement of the support member 76 and the associated platform 27 for the exit of the wheelchair 28;

a limit switch 88 stops the upward movement of the support member 76 at a level where the user can enter the front seat of the vehicle across the assist seat 36, after the wheelchair is returned to the platform 27 and the motor M-4 is actuated by a manual switch 106 (FIGS. 13 and 22);

a limit switch 90 stops the upward movement of the platform portion 40 after the motor M-3 is actuated by a manual switch 104 (FIGS. 13 and 22) and the outer rail 42 of the wheelchair 28 has been pulled toward the vehicle 10, onto the platform portion 38;

where required, a limit switch 91 may be operatively connected to the limit switch 90 and the motor M-3 to shut off the motor M-3 once the platform portion 40 is positioned while the platform 27 continues pivoting, to prevent excess drain on the vehicle battery, represented at B;

a limit switch 92 stops the pivotal movement of the platform 27, the wheelchair 28, and the stanchion 30 after the motor M-2 is actuated by the manual switch 104; and a limit switch 94 stops the lateral return of the plate 25 and platform 27 to its stored position (FIG. 4) within the vehicle interior after the motor 18 is actuated by a manual switch 98 (FIGS. 13 and 22).

A limit switch 96 serves as a safety switch. It is activated at the same time as the switch 80. Until the switch 96 is actuated, neither the pivot motor M-2 nor the up and down motor M-4 can be operated.

The control unit 23, shown in FIG. 13, is available to the wheelchair and vehicle user, including the plurality of manually actuated toggle switches 98/100, 102/104, and 106/108, and suitable leads 110, 112, 114 and 116 in FIG. 22, to the respective above-described motors M-1, M-2, M-3 and M-4 for loading and unloading actuation of the apparatus 12. Relays as required for the four-motor wiring circuit are represented as 118 in FIG. 22.

Figure 3:
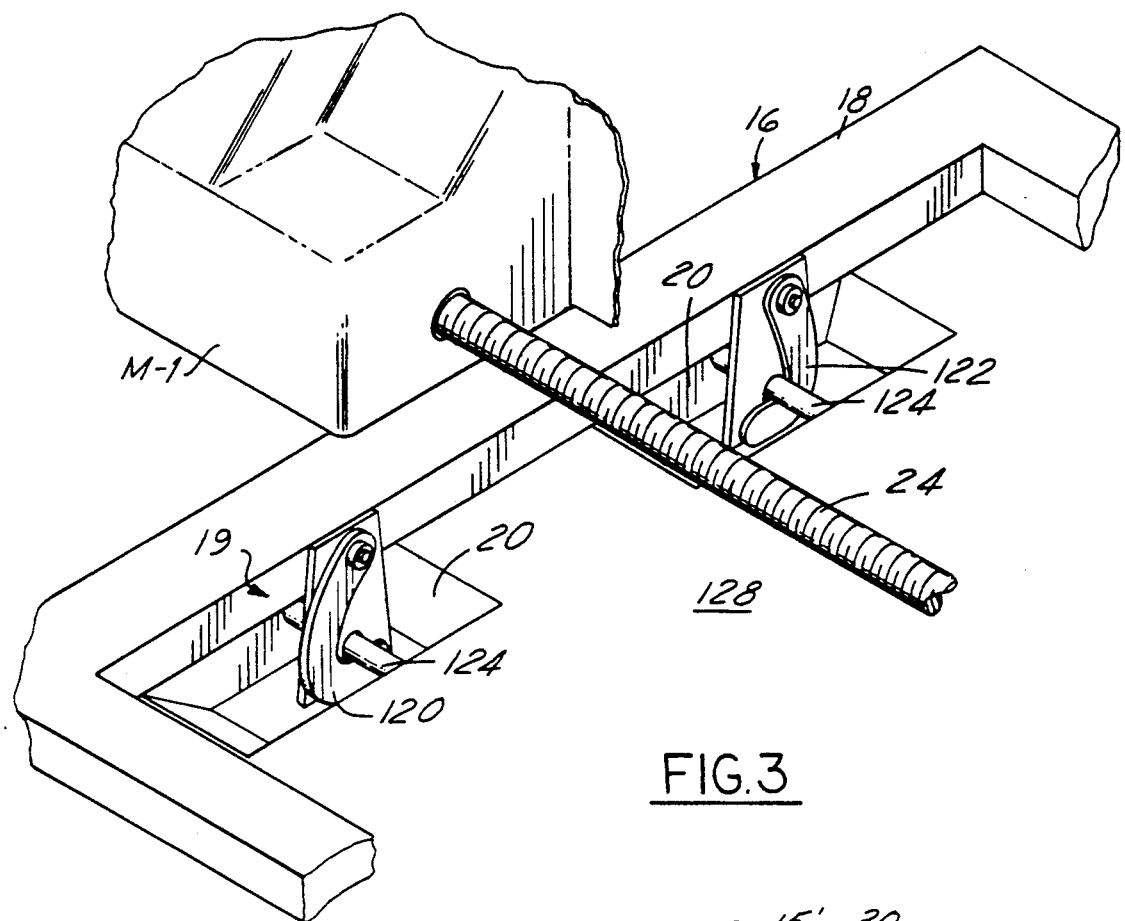
FIG. 3 is an enlarged fragmentary perspective view of a latching arrangement of the invention to the floor pan of a vehicle.

Referring now to FIG. 3, there is illustrated a pair of the latching arrangements 19, illustrative of the frame 17 end rails 18 on each side of the vehicle 10. As shown, front and rear pivotal latch members 120 and 122 are adapted to pivot around latch rods 124 secured in the mounting sockets 20 formed in the vehicle floor pan, represented as 128, to secure the wheelchair lift apparatus 12 to the floor pan. As stated above, the latching arrangement 19 may consist of the elements disclosed in Boone U.S. Pat. No. 5,106,121.

OPERATION

In summary, for the above described apparatus, assume that a wheelchair 28 and its user approach a vehicle having the inventive wheelchair lift apparatus 12 mounted therein. The user or others first open the front driver's or passenger's door and the side door 14 adjacent thereto. By using the hand control operating box 22, he presses the first toggle switch 100 in the "out" direction, causing the platform 27 to traverse laterally through the side door opening. By pressing the second toggle switch 102 in the "swing in" direction, the platform pivots 90° toward the open front door 35. Simultaneously, the vertical side portion 40 of the platform 27 lowers to the plane of the platform 38. By next pressing the third toggle switch 108 in the "down" direction, the platform lowers to the ground and the wheelchair user boards the platform. He then presses the third toggle switch 106 in the "up" direction to raise the platform and wheelchair to the desired height for transferring from the chair 28, across the assist seat 36, to the driver's or passenger's seat 15 or 15'.

Once in the latter seat, he manually collapses the wheelchair 28 on the platform and, via the third toggle switch 108 "down" position, lowers the platform to the proper height for its entry into the vehicle. He next presses the "swing out" position of the second toggle switch 104, causing the platform to pivot 90° rearwardly and, simultaneously, the side portion 40 of the platform to return to its vertical attitude. He then presses the first toggle switch 98 in the "in" direction to cause the platform and its wheelchair to return laterally to the stowed position within the passenger compartment C.

When ready to depart from the vehicle, the front and adjacent side doors must again be opened, either automatically or manually, and the traversing out and pivoting forward steps repeated, followed by pressing the third toggle switch 106 in the "up" direction to a height suitable for the user to spread the sides 42 of the wheelchair, and move from the vehicle seat 15 to the wheelchair 28, prior to lowering the platform 27 to the ground in the manner indicated above. Once he departs from the platform, he repeats the steps of raising, pivoting, and stowing the platform 27, and his control box 22, and closing the doors 35 and 14.

INDUSTRIAL APPLICABILITY

It should be apparent that the invention provides an efficient wheelchair lift apparatus which can either accompany a vehicle as original equipment or which can be adapted to existing latching mechanisms as an aftermarket item in lieu of the seat(s) immediately behind the operator, in any vehicle having either a right hand or left hand side door.

It should be further apparent that the invention provides a wheelchair lift mechanism which enables the user to transfer directly to either or leave the operator seat or front passenger seat at an elevated position adjacent thereto, without having to be transported into and out of the rear portion of the vehicle along with the wheelchair.

It should be still further apparent that, for some vehicles, the horizontal platform may be wide enough to hold a wheelchair in its full width unfolded condition, thus eliminating a need for a pivotal vertical platform portion.

It should also be apparent that, since the user does not ride in the wheelchair into or out of the vehicle, vehicle models having various floor and overall heights would be adaptable to receiving the frame and stanchion. However, mini-vans and larger vans, with side doors behind the usual front doors on one or both sides thereof, are particularly adaptable to receiving the frame and stanchion.

It should be still further apparent that, for a vehicle having a large enough side opening, a full width platform could be used, without a fold-down portion being required, to thus hold a full width, uncollapsed wheelchair.

While but on embodiment of the invention has been shown and described, other modifications thereof are possible within the scope of the following claims.

What is claimed is:

1. A wheelchair lift apparatus adapted for removable use with a vehicle body, the body having a passenger compartment defined in part by a floor and two sides, one of said body sides having a front door opening and an adjacent side door opening, each said front and side door opening having an associated door movable supported relative thereto, the passenger compartment having front seat means fixed to the floor providing a driver's seat and a front passenger seat, seat retention means disposed in the floor for removably coupling a rear seat to the floor in transverse alignment with the side door opening, said removable wheelchair lift apparatus comprising:

a base frame having latch means operatively connected thereto adapted to releasably engage said seat retention means, platform means for supporting a wheelchair mounted above said base frame, and actuation means for reciprocally moving said platform means relative to said base frame into and out of the vehicle through said side door opening.

2. A wheelchair lift apparatus adapted for use with a vehicle body, the body having a passenger compartment defined in part by a floor and two sides, one of said body sides having a front door opening and an adjacent side door opening, each said front and side door opening having an associated door movable supported relative thereto, the passenger compartment having front seat means fixed to the floor providing a driver's seat and a front passenger seat, seat retention means disposed in the floor for removably coupling a rear seat to the floor in transverse alignment with the side door opening, said wheelchair lift apparatus comprising:

a base frame, platform means for supporting a wheelchair mounted above said base frame, first actuation means for moving said platform means relative to said base frame into and out of the passenger compartment via the side door opening, a pivot operatively connected to said platform means, second actuation means for pivoting said platform means about said pivot to a forward location whereby the wheelchair is positioned alongside the front seat means, thereby permitting a wheelchair user to enter and egress the front seat means via the front door opening from and to the wheelchair, and third actuation means for lifting and lowering said platform means and wheelchair from and to the ground.

3. A wheelchair lift apparatus adapted for removable use wit a vehicle body, the body having a passenger compartment defined in part by a floor and two sides, one of said body sides having a front door opening and an adjacent side door opening, each said front and side door opening having an associated door movable supported relative thereto, the passenger compartment having front seat means fixed to the floor providing a driver's seat and a front passenger seat, seat retention means disposed in the floor for removably coupling a rear seat to the floor in transverse alignment with the side door opening, said removable wheelchair lift apparatus comprising:

a base frame having latch means operatively connected thereto adapted to engage said seat retention means, platform means for supporting a wheelchair mounted above said base frame, first actuation means for moving said platform means relative to said base frame into and out of the passenger compartment via the side door opening, a pivot operatively connected to said platform means, second actuation means for pivoting said platform means about said pivot to a forward location whereby the wheelchair is positioned alongside the front seat means, thereby permitting a wheelchair user to enter and egress the front seat means via the front door opening from and to the wheelchair, and third actuation means for lifting and lowering said platform means and wheelchair from and to the ground.

4. The wheelchair lift apparatus described in claim 3, wherein said platform means includes a horizontal portion adaptable to holding a wheelchair whose sides are collapsed inwardly, and a vertical portion to conserve space within the vehicle.

5. The wheelchair lift apparatus described in claim 4, and fourth actuation means for lowering and raising said vertical portion to and from said horizontal portion at which the wheelchair may be spread to its full usable width.

6. The wheelchair lift apparatus described in claim 4, and ramp members pivotally connected to the respective horizontal and vertical portions of said platform means.

7. The wheelchair lift apparatus described in claim 3, and a pivotally mounted assist seat adjacent the wheelchair for cooperation with the latter and one of the vehicle operator's seat and front passenger seat.

8. The wheelchair lift apparatus described in claim 3, wherein said first actuation means includes a motor and a threaded rod operatively connected between said motor and said platform means to move said platform means and wheelchair laterally across said vehicle above said base frame.

9. The wheelchair lift apparatus described in claim 3, wherein said pivot includes a vertical hinge operatively connected between said platform means and said base frame.

10. The wheelchair lift apparatus described in claim 9, wherein said second actuation means includes a motor for moving said platform means about said vertical hinge.

11. The wheelchair lift apparatus described in claim 3, wherein said third actuation means includes a motor and a threaded rod operatively connected between said motor and said platform means to move said platform means and wheelchair vertically between the ground and said position alongside one of said operator and front passenger seats.

12. The wheelchair lift apparatus described in claim 5, wherein said fourth actuation means includes a motor mounted on said horizontal portion, and including gears and stem member operatively connected between said motor and said vertical portion to lower and raise said vertical portion to and from the plane of said horizontal portion.

13. The wheelchair lift apparatus described in claim 3, wherein said side door is located behind the front passenger seat.

14. The wheelchair lift apparatus described in claim 3, wherein said side door is located behind the operator seat.

15. The wheelchair lift apparatus described in claim 3, wherein said seat retention means are rods secured in oppositely disposed cavities in the floor of the vehicle, and said latch means includes selectively positioned hooks on said base frame for engaging said rods.

16. The wheelchair lift apparatus described in claim 11, wherein said motor and said threaded rod are mounted within an enclosed stanchion, and said pivot is operatively connected to a side of the stanchion.

17. A wheelchair lift apparatus for use in conjunction with a vehicle having seat mounting means in sockets in the floor thereof for a seat immediately behind operator and front passenger seats, and a side door in an opening adjacent the sockets, said wheelchair lift apparatus comprising a base frame having laterally extending fixed guide rods, latch means pivotally connected to said base frame for operatively engaging said seat mounting means, a support plate member slidably mounted on said guide rods, a vertical bracket secured to said plate member, a vertical stanchion having vertically extending fixed guide rods, a movable frame slidably mounted on said vertically extending fixed guide rods of said stanchion, a hinge pivotally connected between side of said stanchion and said vertical bracket, a horizontal platform member secured to said movable frame above said support plate member, a vertical platform member pivotally connected to an edge of said horizontal platform member oppositely disposed from said stanchion, a first motor mounted on said base frame, a first threaded rod connected between said first motor and said support plate member for moving said support plate member along said laterally extending guide rods into and out of said vehicle through said side door opening, a second motor mounted on said support plate member, linkage means connected between said second motor and said horizontal platform member for pivoting said platform members, said wheelchair, and said stanchion about said hinge to a position along side one of the operator and front passenger seats, a third motor mounted under said horizontal platform member, connector means connected between said third motor and said vertical platform member for pivotally lowering and raising the vertical platform member to and from the plane of said horizontal platform member, and a fourth motor mounted on said stanchion, a second threaded rod connected between said fourth motor and said movable frame for moving the movable frame along said vertically extending fixed guide rods to and from the ground.

18. The wheelchair lift apparatus described in claim 17, wherein said seat mounting means includes a pin secured in each socket, and said latch means includes hooks.

19. The wheelchair lift apparatus described in claim 17, and ramp members pivotally connected to the respective horizontal and vertical platform members.

20. The wheelchair lift apparatus described in claim 17, wherein said wheelchair with the sides thereof collapsed inwardly is adapted to sit on said horizontal platform member within the vehicle, and with the sides thereof spread apart for occupiable use after the vertical platform member has been lowered.

* * * * *